May 6, 1930.  C. R. BUTLER  1,757,169
PISTON
Filed July 28, 1928
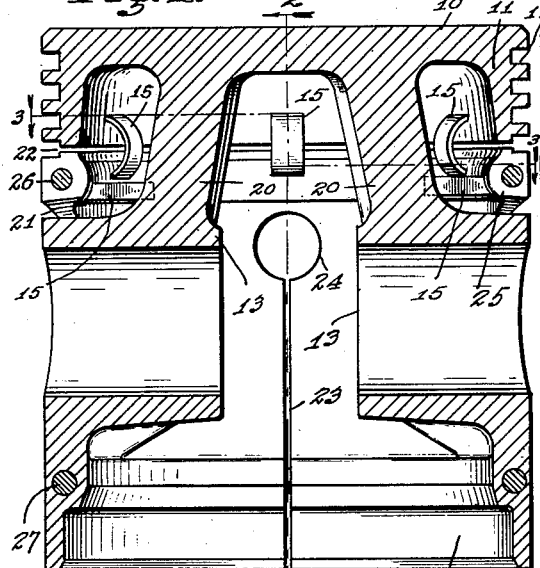
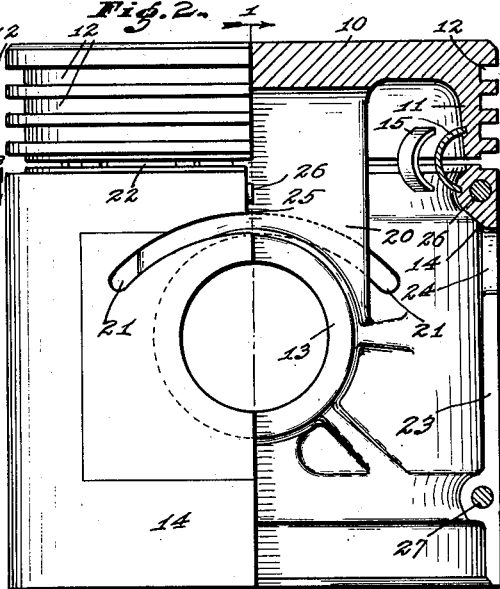
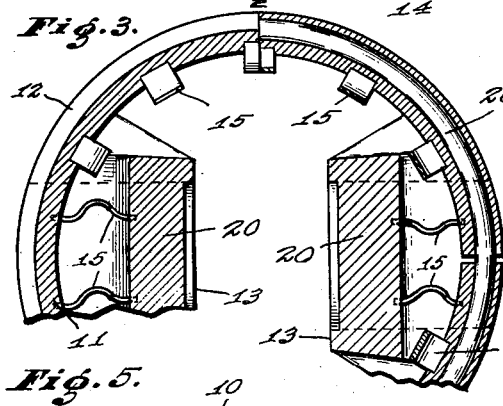
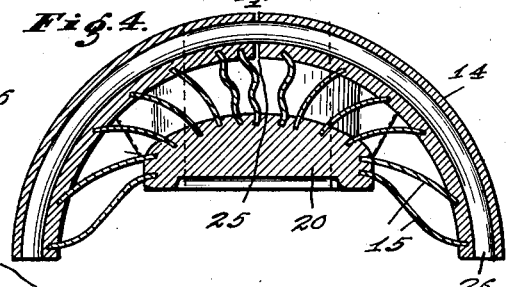
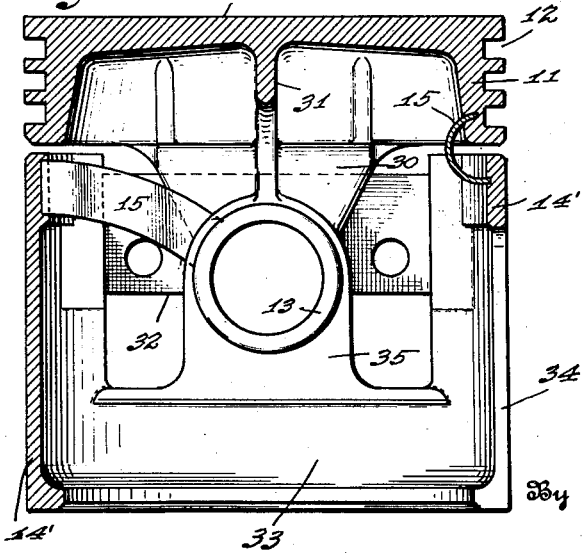
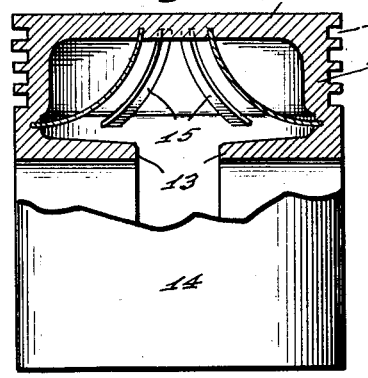
Inventor
CHARLES R. BUTLER,
Attorneys Patented May 6, 1930

1,757,169

UNITED STATES PATENT OFFICE

CHARLES R. BUTLER, OF INDIANAPOLIS, INDIANA

PISTON

Application filed July 28, 1928. Serial No. 295,995.

It is the object of my invention to keep cool the head of the piston of an internal combustion engine.

To this end, it is my object to improve the thermal conductivity between certain regions of a piston structure, and more especially between the piston head and the piston skirt, without thereby affecting mechanically the shape of the piston.

In a piston for internal combustion engines, the piston head receives a great quantity of heat from the hot gas which is directly in contact with it. This heat must be dissipated, in order to prevent the piston head from becoming too hot; as if the piston head becomes too hot serious consequences and even failure may ensue. Among such serious consequences are pre-ignition and detonation, and destruction of lubricant at the piston head and at the wrist pin; and the reduction of power and efficiency by the necessity of lowering the compression ratio to avoid such detonation.

To avoid these difficulties, therefore, at least a large part of the heat received by the piston head must be carried to the lower-temperature piston skirt, for dissipation therefrom both internally and externally.

On the other hand, in many piston structures, the metal which is provided in the piston for mechanical strength and for normal control of thermal expansion is not sufficient in cross-section or properly located to serve most advantageously as a heat conductor to transfer heat from the piston head to the piston skirt; with the result that the heat is stored up in the piston head, and such piston head becomes too hot. This is especially the case in heavy duty engines. This difficulty is augmented in certain modern pistons, in which the metal of the piston skirt is separated more or less completely from the metal of the piston-ring belt by a transverse circumferential slit; and the piston skirt or various portions thereof are carried more or less completely by the piston-pin bosses, which in turn are connected to the piston head.

In carrying out my invention, I provide relatively flexible metal connectors which extend between those parts of the piston between which it is desired to increase the thermal conductivity. For instance, there may be such heat-conducting flexible connectors between the center of the piston head and the skirt below the piston-ring belt; and/or as spanners extending internally of the piston across the aforesaid circumferential slit between the piston-ring belt and the skirt; and/or between the piston skirt and the piston-pin bosses; and/or between the piston skirt and webs that interconnect the piston-pin bosses to the piston head. In general, these heat-carrying flexible conductors may be arranged between any two portions of the piston between which it is desired to increase the heat conductivity without varying the mechanical reactions of one part of the piston on another; and especially between the piston skirt and one or more piston parts which have a higher operating temperature than has the piston skirt.

The accompanying drawing illustrates my invention: Fig. 1 is a longitudinal section of one type of piston embodying my invention, the section being taken substantially on the axis of the piston pin and on the line 1—1 of Fig. 2; Fig. 2 is a partial elevation of the piston shown in Fig. 1 and a partial section on the line 2—2 of Fig. 1, the view being taken looking at the end of the piston pin; Fig. 3 is a partial transverse section substantially on the line 3—3 of Fig. 1; Fig. 4 is another partial transverse section through a piston embodying my invention in a slightly different form, the section being taken on a transverse plane substantially corresponding with that on which Fig. 3 is taken; Fig. 5 is a longitudinal section taken substantially perpendicular to the piston-pin axis and showing my invention as applied to a type of piston in which sections of the piston skirt are connected to the piston-pin bosses by metal of a different co-efficient of thermal expansion from that of the metal of the remainder of the piston; and Fig. 6 is a partial longitudinal section and partial elevation showing my invention as applied to a conventional type of piston.

The piston to which my invention is applied may be of any suitable type. Speaking generally, such a piston always has a piston head 10, provided with a depending circumferential flange or piston-ring belt 11 having the usual piston-ring grooves 12; piston-pin bosses 13, for receiving the usual piston pin; and a skirt 14 which may be either a continuous skirt joining directly to the ring-carrying portion 11 of the piston head, as shown in Fig. 6, or a skirt which is divided into sections by various slits or slots and/or is mechanically separated from the ring-bearing portion of the piston head instead of being continuous therewith, as is shown in other figures of the drawing.

The various portions of the piston between which it is desired to increase the heat conductivity are inter-connected by flexible conductors 15, of some suitable highly conductive material, such as copper; which flexible connectors have their ends embedded in the piston portions between which it is desired to increase the heat conductivity. These flexible conductors 15 are sufficiently flexible to permit relative movement between the parts of the piston which they connect, such as those due to changes in temperature of the various parts.

The various types of pistons shown will be described separately, so far as is necessary to an understanding of my present invention.

In the piston construction shown in Figs. 1, 2, and 3, the piston head 10 is connected to the piston-pin bosses 13 by struts or webs 20, shown as extending from the inner ends of the piston-pin bosses to the head at intermediate points on the diameter of the head. The piston-pin bosses carry the piston skirt 14, which is shown as cut away from the outer end of the bosses between the bosses and the piston head by crescent slots 21. The skirt 14 as a whole is separated from the piston-ring belt 11 of the piston head by a circumferential slit 22, provided for reasons not here essential; so that such slit interrupts the direct heat path from the piston-ring belt 11 to the skirt. The skirt 14 is provided with slits 23 which extend upward from the bottom of the skirt to about the level of the top of the piston-pin bosses 13, and there terminate in a hole 24 provided to prevent cracking or splitting; the longitudinal slits 23 being spaced substantially 90° around the piston from the axis of the piston pin. Other slots 25 extend upward in the longitudinal plane of the piston pin from the crescent slots 21 to the circumferential slit 22. The piston as a whole, as thus far described, may be made of aluminum or some suitable aluminum alloy, or other relatively light metal; and is shown as having embedded in it endless steel bands or rings 26 and 27 which are located in transverse planes above and below that of the piston pin. The steel bands 26 and 27 cross the slots 25 and 23 respectively.

According to the present invention, as applied to the type of piston just described and shown in Figs. 1, 2, and 3, the heat-carrying flexible conductors 15 interconnect the piston parts on opposite sides of the circumferential slits 22. These flexible conductors are shown as arch-shaped members, which have their ends embedded in the piston-ring belt 11 of the piston head and in the piston skirt just below the slot 22. The connectors 15 thus serve to carry heat from the piston-ring belt 11 to the upper part of the piston skirt; and thus carry off some of the heat from the piston head.

In the operation of the piston shown in Figs. 1, 2, and 3, there are certain relative movements between the piston parts, upon rise and fall of the temperature of the piston, but the nature of these is not essential here. These relative movements may still take place substantially undisturbed by the flexible heat-conductors 15, since the latter bend as necessary to permit such relative movements as may occur.

Instead of having the flexible conductors 15 extending between the piston skirt and the piston-ring belt 11 of the head, or in addition to the heat conductors so located, I may provide heat conductors 15 which extend from the upper portion of the skirt 14 to the struts or webs 20. This is illustrated separately in Fig. 4; which shows the same general type of piston as do Figs. 1, 2, and 3, but with the flexible conductors 15 differently arranged. It is illustrated in addition to the flexible heat conductors which directly interconnect the ring-belt portion and the skirt, in Figs. 1 and 3. The flexible conductors 15 in the piston of Fig. 4, and the additional flexible conductors between the skirt and the struts in Figs. 1 and 3, are bent in any suitable shape which permits ready flexing, and have their inner ends embedded in the struts or webs 20 and their outer ends embedded in the skirt 14. These conductors 15 serve to carry heat from the struts or webs 20 to the skirt, and thus serve to facilitate the dissipation of heat from the piston head.

In the piston shown in Fig. 5, the piston head 10 is connected to the piston-pin bosses 13 by webs 30 and 31, and the piston-pin bosses are connected to skirt segments 14' by cross-struts 32. This is a known construction, with the head and the skirt segments made of aluminum alloy and the cross-struts 32 made of steel. The cross-struts 32 have their ends embedded in the skirt sections 14', and their middle portions embedded in the metal of the piston-pin bosses and sometimes in that of the webs 30. In Fig. 5 I have shown the lower ends of the skirt segments 14' as being joined together, by having them parts of the continuous or substantially continuous barrel portion 33 at the bottom of the piston, with a substantially longitudinal slot 34 extending upward from the lower edge of the piston skirt to about the transverse plane of the piston pin in one of the skirt segments 14' if that is desired; and with aluminum connecting members 35 extending upward from this lower barrel portion 33 to the piston-pin bosses 13. As already stated, this steel-strut type of piston is already known, and I have illustrated it merely to show the application of my invention thereto.

According to my invention, different parts of the piston shown in Fig. 5 may be interconnected by heat-conducting flexible conductors 15. For instance, there may be such conductors between the piston-ring belt 11 of the piston head and the upper portions of the skirt sections 14', as shown at the right-hand side of Fig. 5; and/or there may be flexible conductors 15 extending from the upper ends of such skirt segments 14' to the piston-pin bosses 13, as indicated at the left-hand side of Fig. 5. These conductors 15, in either or both of the locations just mentioned or in other locations, serve to assist in carrying to the skirt segments heat which entered the piston by the piston head, thus helping to keep the piston head from becoming too hot.

Although my invention is of especial importance when the piston skirt is not directly connected to the piston head, it is also of value in the ordinary type of piston in which the piston skirt is so connected. This is illustrated in Fig. 6, where the piston shown is of a simple and conventional construction much used in cast-iron pistons, with the skirt 14 directly joining the piston-ring belt 11 of the piston head, and with the piston-pin bosses 13 provided in such skirt. Here, to facilitate cooling of the piston head, and especially to avoid the frequent hot spot at the center of the piston head, I provide flexible conductors 15 which extend from the general middle portion of the piston head to the piston skirt above the piston-pin bosses, and which effectually keep the piston head sufficiently cool.

My invention is applicable to many other forms of pistons, which I need not describe here, since modifications necessary to apply my invention to these other types of pistons will be apparent from the foregoing.

I claim as my invention:

1. A piston construction having various parts provided for mechanical strength, and which parts are capable of slight movement relative to and independent of one another, and in addition heat conductors applied to the piston structure to carry heat between portions of the piston over other paths than those available in the body of the piston, said heat conductors being flexible and of such shape that they bend readily upon relative movement between the piston parts which they connect.

2. A piston construction having various parts provided for mechanical strength, and which parts are capable of slight movement relative to and independent of one another, and in addition heat conductors applied to the piston structure to carry heat between portions of the piston over other paths than those available in the body of the piston, said heat conductors being flexible and of such shape that they bend readily upon relative movement between the piston parts which they connect and in addition being of a metal different from that of the body of the piston and having their ends embedded in the metal of the piston parts which they connect.

3. A piston, comprising a head having a piston-ring belt, a skirt which is mechanically separated from said piston-ring belt, and mechanical interconnections between the piston head and the skirt other than by way of a direct connection between the piston-ring belt and the skirt; and flexible conductors of high heat conductivity interconnecting said skirt portion with said head.

4. A piston, comprising a head having a piston-ring belt, a skirt which is mechanically separated from said piston-ring belt, and mechanical interconnections between the piston head and the skirt other than by way of a direct connection between the piston-ring belt and the skirt; and flexible conductors of high heat conductivity interconnecting said skirt portion with said piston-ring belt of the piston head.

5. A piston construction having a head, a skirt which is mechanically separated from said head at the periphery, and mechanical interconnections internally of the piston interconnecting the piston head to the skirt; and flexible conductors of high heat conductivity for assisting said mechanical interconnections in carrying to the skirt heat derived from the piston head.

6. A piston construction having a head, a skirt which is mechanically separated from said head at the periphery, and mechanical interconnections internally of the piston interconnecting the piston head to the skirt; and flexible conductors of high heat conductivity connecting said skirt to piston parts which have a higher operating temperature than the skirt.

7. A piston, comprising a head having a piston-ring belt and depending struts separate from said piston-ring belt, piston pin bosses and a skirt carried by said struts, and flexible conductors of high heat conductivity interconnecting said skirt to said struts.

8. A piston, comprising a head having a piston-ring belt and depending struts separate from said piston-ring belt, piston pin bosses and a skirt carried by said struts, and flexible conductors of high heat conductivity interconnecting said skirt both to said struts and to said head.

In witness whereof, I have hereunto set my hand at Indianapolis, Indiana, this 25th day of July, A. D. one thousand nine hundred and twenty-eight.

CHARLES R. BUTLER.